UNITED STATES PATENT OFFICE.

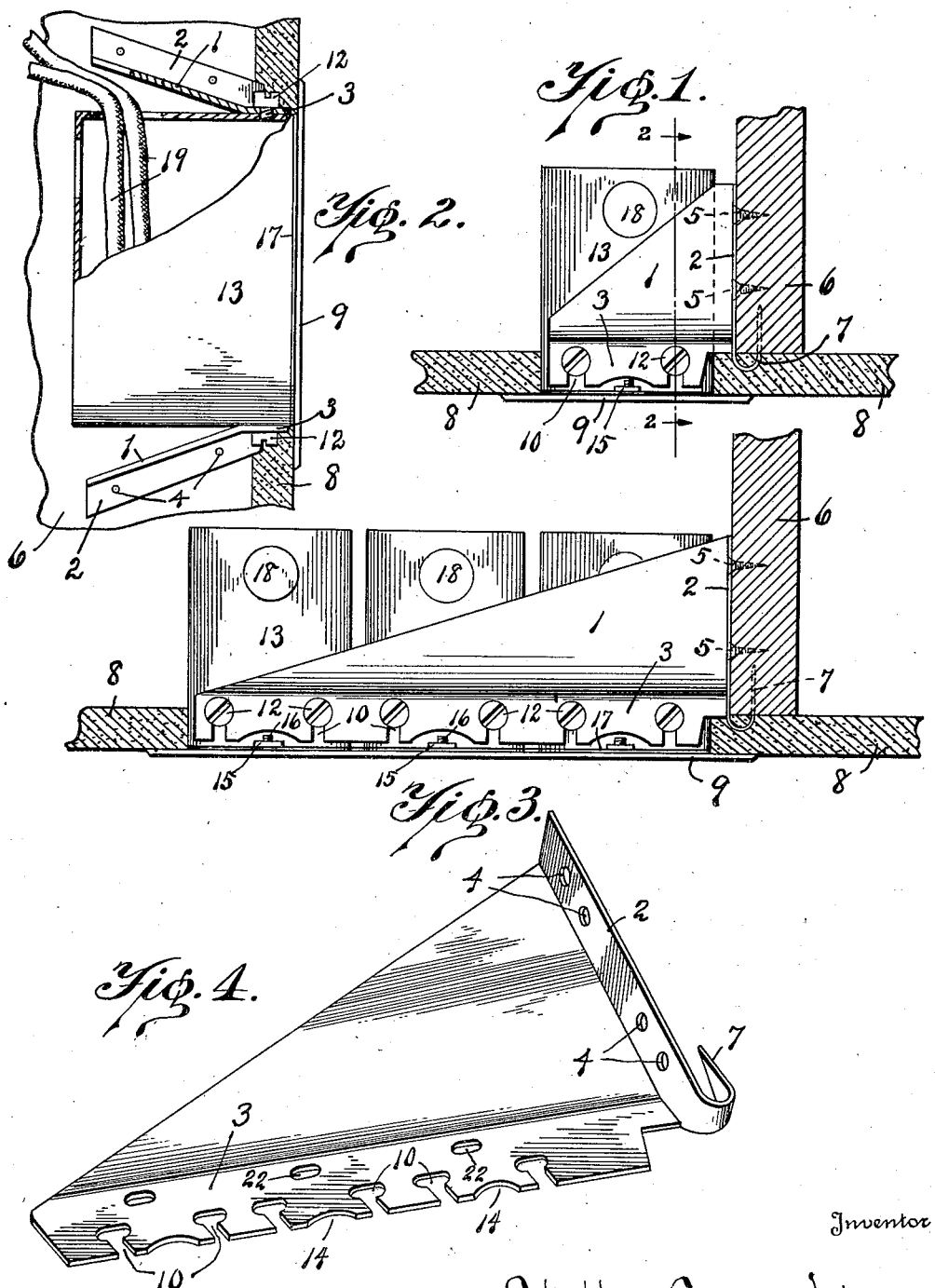

STEPHEN GORDON JOHNSON, OF DETROIT, MICHIGAN, ASSIGNOR OF ONE-HALF TO LEON L. UTTER, OF DETROIT, MICHIGAN.

SWITCH-BOX SUPPORT.

1,346,895. Specification of Letters Patent. Patented July 20, 1920.

Application filed October 8, 1919. Serial No. 329,399.

*To all whom it may concern:*

Be it known that I, STEPHEN GORDON JOHNSON, a citizen of the United States, and residing at Detroit, in the county of Wayne and State of Michigan, have invented a new and Improved Switch-Box Support, of which the following is a specification.

This invention relates to brackets or supports for switch boxes and similar receptacles, and its object is to provide devices of this character which, together with the boxes or receptacles supported thereby, may be secured in position in the shortest possible time, which will hold the boxes rigidly in position, which may be easily removed and replaced, which will fit any standard switch box, which will require a minimum of space, and which will allow free access to all "knock-out" plugs.

In the accompanying drawing, Figure 1 is a plan of one of these improved supports securing a switch box to a structural member such as a joist or stud. Fig. 2 is a section on the line 2—2 of Fig. 1. Fig. 3 is a plan of a support of somewhat larger size and three switch boxes supported thereby. Fig. 4 is a perspective view of one of these improved supports.

Similar reference characters refer to like parts throughout the several views.

Switch boxes are usually positioned between the studs of the walls of buildings and wood supports for the boxes are usually secured between the studs and the switch boxes are attached to these supports. The hit and miss construction of such supports is not only very expensive but is decidedly awkward as the switch box must often be demounted to permit the "knock-out" plugs to be removed. The present invention is embodied in supports which may not only be attached temporarily to studs by means of hooks or points which may be driven into the wood and will sustain the supports and the boxes attached thereto until permanent fastenings can be employed, but may be quickly disconnected without injury and secured elsewhere should a new location of such box be selected.

These supports are generally triangular with a central portion 1 and two perforated flanges 2 and 3, the former adapted to be flat against a stud or joist and the latter at right angles to the plane of the former and preferably forming an oblique angle with the central portion of the support. The flange 2 is formed with any desired number of holes 4 to receive nails or screws 5 by means of which the support may be secured to the stud 6.

At the front ends of the flanges 2 are hooks 7 having rearwardly extending sharp points which may be easily and quickly driven into the stud 6 and thus hold the supports and boxes in position until the screws 5 can be set to secure the supports and boxes in the final locations. These hooks 7 being driven into the edges of the studs also serve as gages to determine the distance from the front edges of the boxes to the finished surfaces of the plaster 8 so that the cover plates 9 will always fit against the plaster.

The flange 3 is formed with T slots or notches 10 to receive the screws 12 which secure the switch boxes 13 to the supports. The shape of these notches permits the screws 12 to be entered even when the holes in the boxes vary somewhat from the accepted standard. The metal at the edges of the flanges 3 may be cut away at 14 to afford room for the small lugs 15 to which the switch plates 17 are secured by means of the screws 16. The number of the notches 10 will depend upon the length of the support and upon the number of switch boxes to be carried thereby. The inclination of the body 1 of the support to the flange 3 tends to widen the base of the combined structure and also to give access to the "knock-out" plugs 18 and to the holes left thereby through which the wires 19 may be inserted. The holes 4 are preferably more numerous than the screws required so that possible obstructions in the base 6 may be avoided. While the hooks 7 support the boxes, the workmen may use both hands to set the screws 5. The thinness of the sheet metal makes for saving of space and maximum room for the workmen. It is apparent that these supports may be attached to either sides of studs, joists or rafters.

In certain cases, the slots 10 may not correspond to the spacing of the supporting screws for the switch boxes. The holes 22 shown in Fig. 4 in the flange 3 may be spaced to take care of such screws which do not correspond to standard spacings, or are spaced according to a different standard. The words "switch-box" in this specification are intended to embrace all types of boxes in which switches and connectors are mounted, such as base-receptacles, and should not be confined to the boxes which support the ordinary wall push-button switches.

The sizes and proportions of these brackets and the shapes and sizes of the holes therein may all be varied to meet varying conditions by those skilled in the art without departing from the spirit of my invention as set forth in the following claims.

I claim:—

1. A switch box support comprising a body generally triangular in form and having perforated flanges along two edges, said flanges being in planes at right angles to each other, one of the flanges being adapted to be secured to a structural member and the other flange to a switch box, the latter flange being at an oblique angle to the body of the support.

2. A switch box support comprising a body generally triangular in form and having perforated flanges along two edges, said flanges being in planes at right angles to each other, one of the flanges being adapted to be secured to a structural member and the other flange to a switch box, the latter flange being at an oblique angle to the body of the support, and a hook attached to one end of the flange that is to be secured to the structural member and pointing back parallel to the flange to which it is attached.

3. A support for boxes comprising a sheet metal body having perforated flanges along two edges in planes at right angles to each other, one of the flanges being adapted to be secured to a structural member and the other flange to a switch box, the latter flange being at an oblique angle to the body of the support and having perforations in the form of T-shaped slots and its edge between the slots indented.

STEPHEN GORDON JOHNSON.